(12) United States Patent
Vachhani et al.

(10) Patent No.: US 11,374,938 B2
(45) Date of Patent: Jun. 28, 2022

(54) DATABASE-AGNOSTIC SECURE STRUCTURED DATABASE CONNECTOR

(71) Applicant: JPMorgan Chase Bank, N.A., New York, NY (US)

(72) Inventors: Swapnil Vachhani, Jersey City, NJ (US); Chris Festa, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 335 days.

(21) Appl. No.: 16/392,118

(22) Filed: Apr. 23, 2019

(65) Prior Publication Data

US 2020/0344244 A1   Oct. 29, 2020

(51) Int. Cl.
*H04L 9/40* (2022.01)
*G06F 21/41* (2013.01)
*G06F 16/25* (2019.01)

(52) U.S. Cl.
CPC .......... *H04L 63/108* (2013.01); *G06F 16/252* (2019.01); *G06F 21/41* (2013.01); *H04L 63/102* (2013.01)

(58) Field of Classification Search
CPC ... H04L 63/08; H04L 63/0815; H04L 63/083; H04L 63/102; H04L 63/108; G06F 21/41; G06F 21/604; G06F 21/62; G06F 21/6218; G06F 21/6227; G06F 21/6236; G06F 16/24; G06F 16/242; G06F 16/2423; G06F 16/25; G06F 16/252; G06F 16/254; G06F 16/258
See application file for complete search history.

(56) References Cited

U.S. PATENT DOCUMENTS

| | | | |
|---|---|---|---|
| 10,599,487 B1 * | 3/2020 | Goodwin | G06F 16/22 |
| 2004/0128301 A1 | 7/2004 | Thint et al. | |
| 2006/0195888 A1 | 8/2006 | Kalonji et al. | |
| 2009/0249458 A1 * | 10/2009 | Banga | G06F 21/31 |
| | | | 707/999.1 |

(Continued)

OTHER PUBLICATIONS

Official communication (Search Report and Opinion) in W.I.P.O Patent Application No. PCT/US2020/29343, dated Jul. 21, 2020.

*Primary Examiner* — Shanto Abedin
*Assistant Examiner* — Bruce S Ashley
(74) *Attorney, Agent, or Firm* — Greenblum & Bernstein, P.L.C.

(57) ABSTRACT

Systems and methods for connecting to and managing access to multiple targeted data stores are provided. The system includes at least a client system for requesting access to multiple datastores and to perform an operation on data from the data stores per a user request. The system further includes an entitlement system for identifying the user and target data stores, and for authenticating the user to access the data stores to perform an operation on the requested data. The entitlement system may be configured to identify one or more connection strings corresponding to each database management system (DMS), and to generate a database agnostic connection string for providing access to the data stores simultaneously. The entitlement system may also be configured to implement additional security provisions for connecting to the data stores, including closing any open connections at the expiry of the operation on the data.

16 Claims, 6 Drawing Sheets

(56) References Cited

U.S. PATENT DOCUMENTS

| | | | |
|---|---|---|---|
| 2011/0093937 A1* | 4/2011 | Mantle | G06F 21/44 726/6 |
| 2011/0213778 A1* | 9/2011 | Hess | G06F 16/2471 707/740 |
| 2013/0225123 A1 | 8/2013 | Adjakple et al. | |
| 2015/0074249 A1 | 3/2015 | Connelly et al. | |
| 2016/0088463 A1 | 3/2016 | Stanke et al. | |
| 2016/0335104 A1* | 11/2016 | Elias | G06F 13/102 |
| 2019/0005047 A1* | 1/2019 | D'Amore | G06F 16/252 |
| 2020/0007530 A1* | 1/2020 | Mohamad Abdul | H04L 67/26 |

* cited by examiner

DATABASE-AGNOSTIC SECURE STRUCTURED DATABASE CONNECTOR

TECHNICAL FIELD

The present disclosure relates generally to database systems, and more particularly, to database agnostic drivers for interacting with database management systems and data stores and methods of using the same.

BACKGROUND

Many data intensive firms provide a large number of data stores (e.g., >10,000) for users to access various types of information. Traditional applications for accessing the information typically connect to a single data store at a time, even though the firm may require connecting to all or a large subset of the data stores to complete the user's task. In the traditional application operation, when a user requires access to multiple data stores in their firm, the application connects to the data stores one at a time in order to manage the user's credentials and the connection strings for each of the target data stores in the firm that requires a connection. These traditional applications also create a permanent database account on each data store in the firm for the user to provide access. This results in unnecessary excess user database accounts, which would include confidential information, in each of the data stores. Having multiple accounts in this manner leads to several issues including, for example, issues that arise when a user's credentials change. The traditional applications often fail to maintain each of the created permanent account credentials, e.g., when the user credentials change, possibly due to the limited amount of resources or bandwidth available. Also, because of the shared and permanent nature of the created account, including user credentials, the permanent accounts become vulnerable to targets for breaching the data stores because they are often not maintained by the traditional applications and fail to include any security measures. Accordingly, a need exists for a more efficient system for accessing multiple data stores within or across multiple firms and managing user credentials and permission to provide a more secure connection to the data stores for completing user tasks.

SUMMARY

An object of the present disclosure is to provide an improved database connection and access management system that provides access to multiple data stores via a more secure structured database connection.

In one exemplary embodiment, a database connection and access management system is provided. The database connection and management system includes a client system operably configured to receive user information and data related information from a user for accessing content from a plurality of data stores. The system is further configured to communicate the received user information and the data related information via a change request. The database connection and access management system further includes an entitlement system operably connected to the client system. The entitlement system is operably configured to access the change request to identify user authentication credentials for granting the user access to perform an operation on the content. The entitlement system is further configured to identify at least one or more of the plurality of data stores that requires a connection. The entitlement system is also configured to identify a database management system for each data store in the plurality of data stores, and/or connection strings corresponding to the database management system for each data store. The entitlement system is further configured to generate a temporary profile based on the user authentication credentials and the data related information. The temporary profile includes a structured database connector that includes a unique database agnostic connection string for connecting to each of the plurality of data stores requiring a connection. The entitlement system is further configured to connect to the one or more of the data stores and/or each of the plurality of data stores simultaneously requiring a connection. Additionally, the entitlement system is configured to present the content from the plurality of the data stores to the user.

In a further exemplary embodiment, a method for connecting to a plurality of data stores simultaneously and accessing data associated with a change request from a user is provided. The method may be implemented in, e.g., an entitlement module. The method includes the step of accessing the change request and identifying authentication credentials for the user and the plurality of data stores requiring a connection to present the data associated with the change request. The method also includes the step of authenticating the user based on the authentication credentials. The method further includes the step of generating a temporary profile for accessing the plurality of data stores. The temporary profile includes a unique database agnostic connection string for connecting to each of the plurality of data stores requiring a connection. Additionally, the method includes connecting to the plurality of data stores simultaneously via the unique database agnostic connection string, and presenting the data from the plurality of data stores to the user.

In yet a further exemplary embodiment, a non-transitory computer readable medium comprising executable logic for presenting content from a plurality of data stores to a user is provided. The logic, when executed, e.g., via a processor is operable to access a change request to identify user authentication credentials for granting a user access to perform an operation on content in a plurality of data stores. The change requests identifies at least one or more of the plurality of data stores that requires a connection to provide access, a database management system (DMS) for each data store in the plurality of data stores, or connection strings corresponding to the DMS for each data store. The logic, when executed, is further operable to generate a temporary profile based on the user authentication credentials. The temporary profile includes a unique database agnostic connection string for connecting to the plurality of data stores requiring a connection. The logic, when executed, is also operable to connect to the plurality of data stores requiring a connection simultaneously, and to present the content from the plurality of the data stores to the user.

These and other objects, features, and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

Figure 1:
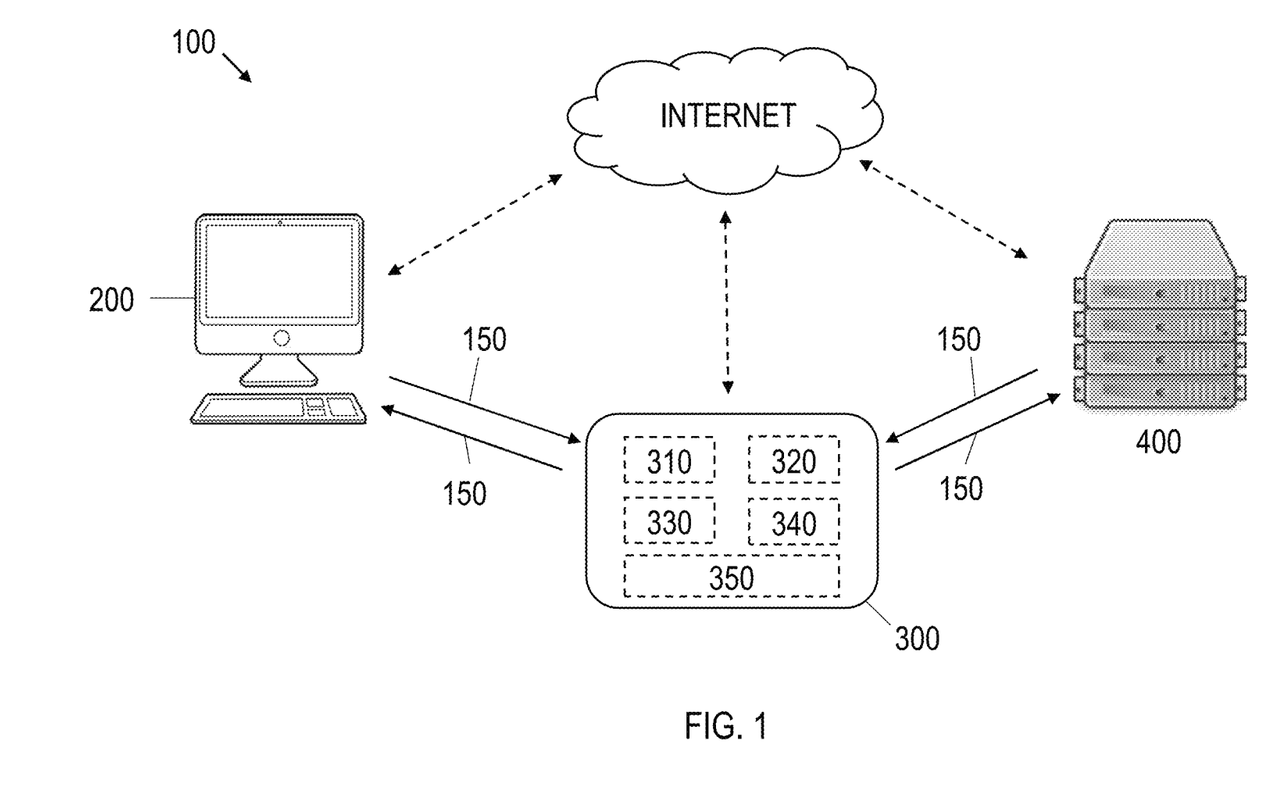
FIG. 1 illustrates an exemplary embodiment of a system in accordance with the disclosure provided herein.

Referring now to the drawings, which are for purposes of illustrating exemplary embodiments of the subject matter herein only and not for limiting the same, FIG. 1 shows an exemplary embodiment of a system 100 for managing database connections for securely controlling access to data from one or more data stores.

As shown in FIG. 1, the system 100 may be a database connection or management system and may include at least a client system 200, an entitlement system 300, and one or more data stores 400 operably connected to each other via a direct communication link 150, remote communications link, or any communication link known to persons of ordinary skill in the art and configurable to allow for communication and/or interfacing between the devices and/or components of the system 100. Examples of such communication links 150 may include Local Area Networks (LAN), Wide Area Networks (WAN), and Global Area Networks (GAN) having wire or wireless branches, including, e.g., the Internet. Additionally, network devices/components and/or nodes (e.g., cabling, routers, switches, gateway, etc.) may also be included in the system 100 for facilitating the transfer of information within the system 100, and between at least the client system 200, the entitlement system 300, and the data stores 400.

Figure 2A:
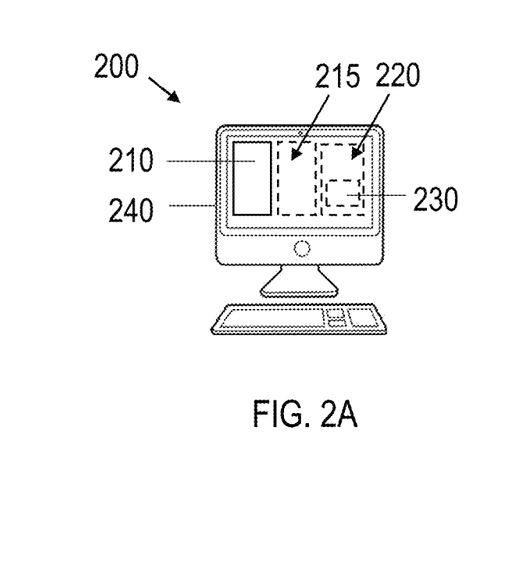
FIG. 2A illustrates an exemplary embodiment of a client system in accordance with the disclosure provided herein.
Figure 2B:
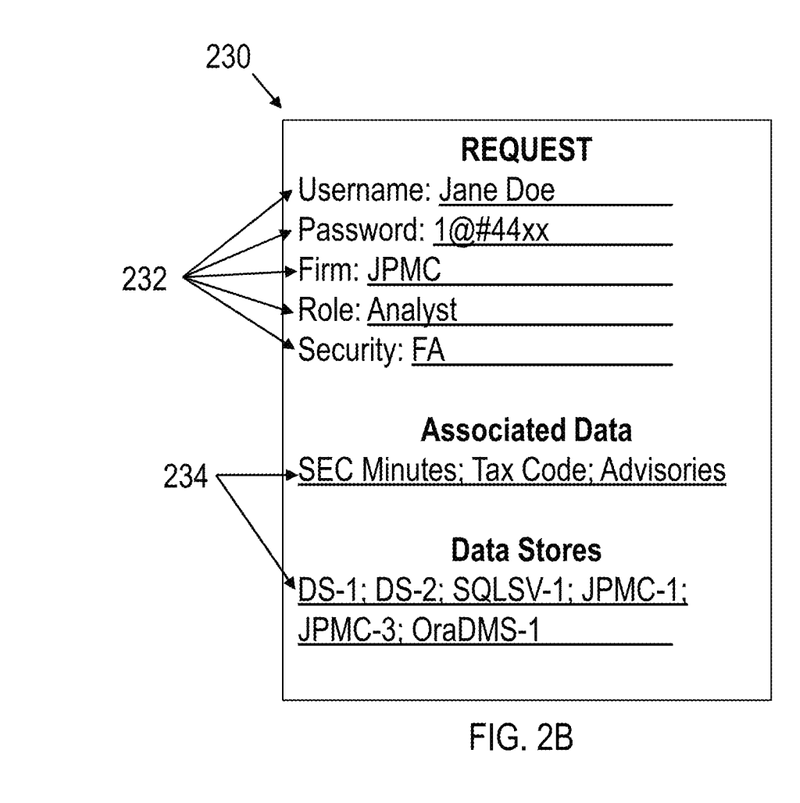
FIG. 2B illustrates an exemplary embodiment of a change request in accordance with the disclosure provided herein.

With continued reference to the figures, and now with additional reference to FIG. 2A and FIG. 2B, the client system 200 may be a personal computer or mobile device, e.g., notebook, tablet, or phone, which may include an interaction module for acquiring user related information 232 that may be particular to a user or client and may include, e.g., the user login name and database or firm access credentials, and data or database related information 234, which may be particular to the data requested by the user and may include, e.g., information associated with the requested data, database, or the data stores 400 with the requested data.

In an exemplary embodiment, the interaction module may include at least a user/application interface (UI) 210 configurable to receive the user related information 232 and database related information 234 from at least the user. The UI 210 may be operably connected to a processor 215 and a memory 220 for executing instructions, e.g., stored on the memory, to generate or submit at least the user related information 232 and database related information 234 as a request 230 (also referred to herein as a change request) to access or perform an operation on data associated with the database related information 234 from the data stores 400. The user related information 232 and database related information 234 may be accessed or otherwise provided to the entitlement system 300 in its native format, or the request 230 may be accessed or otherwise provided to the entitlement system 300 in a .TXT, .PDF, .HTML, or other file type format known in the art. Once the requested results from the request 230 are transmitted from the data stores 400, the requested results may be displayed to the user, e.g., via a display 240 or similar interface, or may be provided to the user in audible, e.g., in an exemplary embodiment where the requested results includes an audio file or a file having audio associated therewith.

The user related information 232 may include at least one or more of, e.g., a user login name and password, access credentials and permissions for the user, e.g., firm name, position/role, security access level etc., which may identify that the user is permitted to access the data associated with the databased related information 234 from one or more of the data stores 400 in a firm or across multiple firms. The database related information 234 may include at least, e.g., a data store identification (DSID) corresponding to a particular data store 400, the type of database management system (DMS) associated with the particular data store 400, or information associated or related to any content requested from the data store 400. Additionally, or alternatively, the interaction module may generate a query, e.g., a random query, which may include any one or more of the user related information 232, the database related information 234, or a subset of data associated with the requested data or the data stores 400 with the requested data, for inclusion with the request 230, or the query may be provided as the request 230 as a means to provide additional security and/or encryption for the content therein.

With continued reference to the figures, and upon identifying or receiving at least the user related information 232 and database related information 234, the processor 215 may be configured to generate the request 230 which may include the received information from the UI 210, the random query, or a subset of the information for transmitting to the entitlement system 300. Additionally, or alternatively, the processor 215 may include date and time information, e.g., as provided by the user or as identified, e.g., via a system clock, with the request 230 for determining a time period or window for the user's request to remain active or open. The request 230 may be stored permanently or temporarily store in the memory 220 or similar storage medium operably connected to one or more devices of the system 100 for being made available to the entitlement system 300.

Figure 3A:
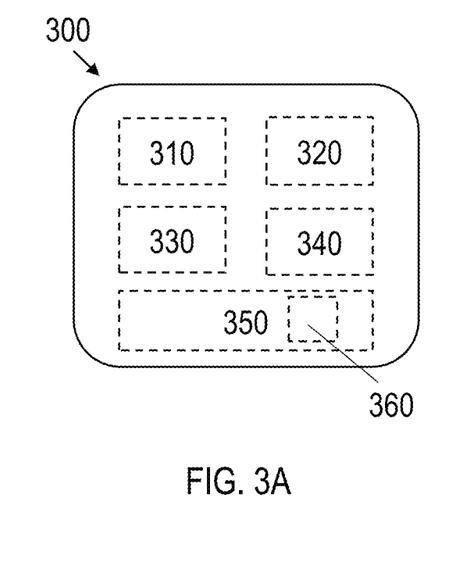
FIG. 3A illustrates an exemplary embodiment of an entitlement system in accordance with the disclosure provided herein.
Figure 3B:
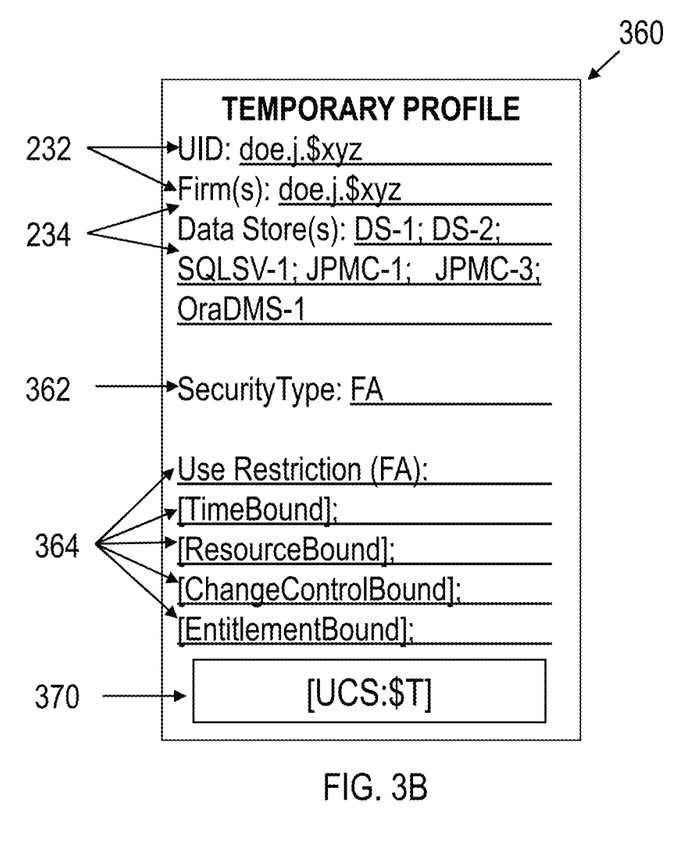
FIG. 3B illustrates an exemplary embodiment of a client account in accordance with the disclosure provided herein.

With continued reference to the figures, and now with additional reference to FIG. 3A and FIG. 3B, the entitlement system 300 may be comprised in software or hardware, e.g., in a controller or server, and may be configured for accessing or receiving the request 230 from the client system 200 to develop or generate a unique structured database connector (SDC) 370 with a unique connection string for securely accessing one or more of the data stores 400 which requires a connection. It should be appreciated that the exemplary embodiments of the SDC 370 may be database agnostic, e.g., it may function to connect with any type of database management system such as, e.g., Oracle, MS SQL Server, Sybase, IBM DB2, Teradata, or the like.

In an exemplary embodiment where the entitlement system 300 is software, the entitlement system 300 may reside in memory 220 or other storage medium on the client system 200 and executed via one or more processing circuits from the client system 200 or a remote server, e.g., the data store 400. Additionally, or alternatively, the entitlement system 300 may further be provided as a combination of software and hardware in operable communication with each of the client system 200 or the data stores 400.

In the exemplary embodiment shown in FIG. 3A, the entitlement system 300 may include at least a processing circuit (also referred to herein as processor) 310 in signal communication with a memory 320, a network interface device 330, and a storage component/device 340.

The processor 310 may be operable to execute a plurality of instructions from a means for connecting to a database, e.g., a database connection program logic or application (DPL) 350, which may be stored in memory 320 or other storage medium, e.g., storage device 340.

The DPL 350 may be any hardware, microcode, firmware, software, programmable logic, or other logic that may, e.g., access, receive, or otherwise identify database connection strings corresponding to the DMS for each of the data stores 400 requiring a connection (also referred to as target data stores 400), and develops or otherwise generates the SDC 370 and unique connection string for providing a secured controlled access to each data store using the unique connection string, which may be a single unique connection string for accessing each type of data store 400 via their DMS. It should be appreciated that the DPL 350 may be its own independent circuitry within the entitlement system 300 and operably connected to the memory 320 and processor 310. It should further be appreciated that the target data store 400 refers to the data store 400 which may include some or all the information requested or desired by the user.

In operation, the DPL 350 may access the request 230 or information from the request 230 from the client system 200, and may generate a temporary account or profile 360 in, e.g., cache memory operably connected to one or more devices in the system 100, for a time period that may be predetermined or preset, or based on the user related information 232, e.g., user credentials or security level, the database related information 234, e.g., change request permissions or operation length, or other information provided in the request 230 or client system 200. In yet a further embodiment, the temporary profile 360 may be a modification of the request 230, i.e., a version of the request that may be edited to include additional security information, which may define several use and access restrictions for the user. Additionally, or alternatively, each of the exemplary embodiments of the generated or otherwise edited temporary profiles 360 disclosed herein may include additional database connection security parameters and/or provisions to protect from, e.g., spoofing, password breach, unauthorized access or other such cyber security breaches. In some embodiment, e.g., as shown in FIG. 3B, a security type 362 may be provided as a security parameter, which may be based on the user's role. The security types 362 may include, e.g., a limited access (LA) type, a full access (FA) type, and/or any other security type parameter useful for restricting unauthorized access and/or cyber security breaches known to persons of ordinary skill in the art.

Additionally, or alternatively, one or more use restriction provisions 364 may be implemented by the system 100, e.g., the entitlement system 300, and may include one or more of a time-bound limitation, a resource-bound limitation, a change/control-bound limitation, or an entitlement bound limitation. As used herein, time-bound may be defined as limits on the account and connection time, e.g., as per a pre-configured value, and which expires after the time period (window) closes such that no new database connections may be made using the account. Resource-bound may be defined as limiting the account's use of the target data store or assigning the account a lower priority over other traffic to and from the target data store 400 as configured. This limitation, when applied, may limit queries and may assist to avoid disruption of normal business activities on the target data store 400.

The change/control-bound may be dependent on the time-bound feature, as the operations on the target data store 400 may only be allowed in the lower value between a time period (window) approved by the change request or as pre-configured in the time-bound control. Entitlement bound may be defined by the set of operation that may be allowed on the target database. The set of operations may be limited by the entitlements approved for the user/client requesting the operation. Additionally, or alternatively, the limits may be defined based on the user's role or security access level which may identify the privileges granted to the user. In some embodiments, in addition to and/or in lieu of the account expiring at the end of the approved change control request window, the expiration period may be defined by, e.g., a maximum time period. In this embodiment, if the change control request window extends beyond the maximum time period, then the account will expire at the end of the maximum time period instead of the end of at the end of the approved change control request window.

Figure 4:
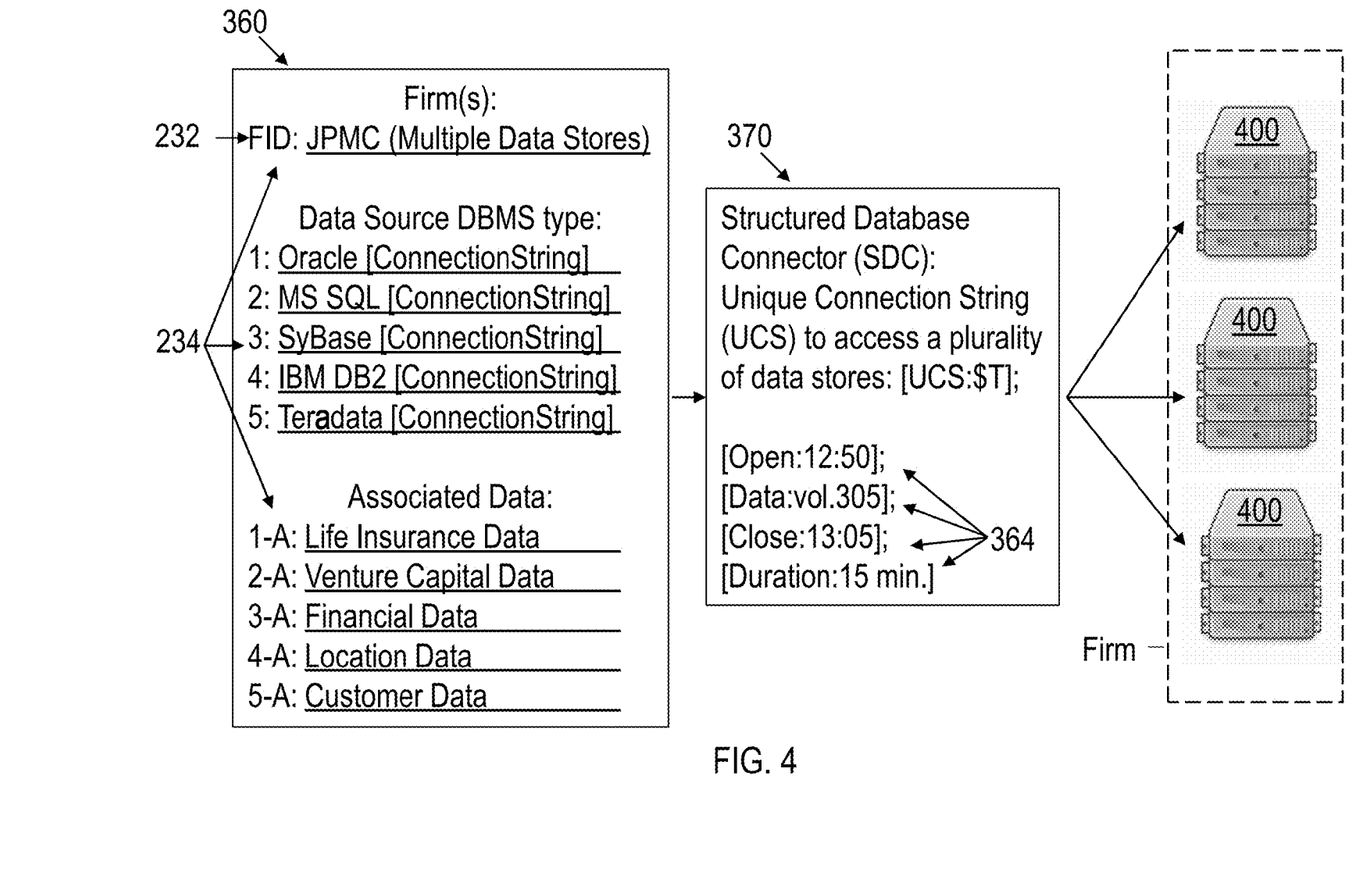
FIG. 4 illustrates yet a further exemplary embodiment of a client account and database connection string in accordance with the disclosure provided herein.

With continued reference to the figures, and now with additional reference to FIG. 4, the data store 400 may be a system or platform having a voluminous amount of resources and content accessible to the user (e.g., an authorized users). Multiple data stores 400 may be provided in a single firm and accessed via the system 100, or in yet a further exemplary embodiment, multiple data stores 400 may be provide across several firms accessible via the system 100 and may include content associated with the database related information 234 provided by the user across the multiple data stores 400.

In an exemplary embodiment where accessing multiple data stores 400 may be required, the DPL 350 may function to generate or otherwise develop the unique connection string for accessing each of the multiple data stores 400 by identifying at least one or more of: the user requesting access to the content, the permissions granted to the user, the data stores 400 with the requested content, the type of DMS running on each of the data stores 400, or the DMS connection strings for the DMS running on each of the data stores 400, and the identified information may be provided, e.g., via the request 230, the modified request, or temporary profile 360.

Upon identifying this information and verifying that the user has the required permissions to access multiple data stores 400 and the requested content, the DPL 350 may utilize the connection strings identified from the request 230, e.g., proprietary connection strings for each DMS, and generate the SDC 370 and corresponding unique connection string based at least in part on the identified connection strings. The generation operation may be provided, e.g., via an automation as a service database connector (AaaSDBX) which may decouple the need to connect to the multiple data stores 400 from its logistics using each of the data stores 400 connection strings as determined by their DMS, and create the unique connection string to connect to the multiple data stores 400, e.g., simultaneously. The generated SDC 370 may further include or define user security parameters associated with and/or corresponding to the user, e.g., the security type parameter 362 (FIG. 3B), and/or the use restriction provision 364, which may include access duration restrictions and/or content restrictions. It should be appreciated that the security parameters may be utilized for each connected data store 400 and/or for all of the data stores 400 where a connection may be required.

In exemplary embodiments described herein, the SDC 370 or custom driver, which may be developed via the AaaSDBX, may eliminate requirements that the client system 200 know the credentials for a particular targeted data store 400 or how to connect to the particular targeted data store 400. The client system 200 may instead provide the DSID requiring a connection, the user credential, e.g., a single sign-on credential (SSO) to authenticate the user, and an approved change request with operation window. This can result in a reduction of the information required by the user. Reducing the amount of information required from the user may provide a more secure solution for accessing multiple data stores 400 than prior traditional applications which again creates permanent accounts in each of the accessed data stores 400. Additionally, or alternatively, the AaaSDBX may use an automation as a service (AaaS) infrastructure as disclosed in U.S. patent application Ser. No. 16/249,293 (filed Jan. 16, 2019, entitled "Automation as a Service" which is incorporated by reference herein, in its entirety) to create the temporary profiles 360 (accounts) using trusted controllers with admin privileges. The AaaSDBX may establish the temporary profile 360 in cache memory and for a time period defined by the length of the requested operation or request 230, whichever may define, e.g., a shorter time period. This temporary profile 360 may remain anonymous, i.e., not known to anyone, and may not be stored in the data stores 400. The temporary profile 360 may reside in a secure cache memory, e.g., where the instructions or DPL 350 may be stored, e.g., memory 220 or memory 320. Additionally, or alternatively, the accounts may be created using DMS instructions. The DMS specific instructions may be coded in a script that may be executed using administrative privileges granted to one or more trusted controllers. Additionally, or alternatively, the accounts may be created through the microservice. In this embodiment, the microservice may determine the credentials for the custom driver, e.g., the username and password. Once created, the microservice may return the custom driver for connecting to the database, and may store the username and password, e.g., in cache memory. In some embodiments, the username and password may be encrypted, e.g., via an encryption module.

In a further exemplary embodiment, the AaaSDBX may provide an abstraction layer on top of the normal connectivity between users and transactional databases to be able to secure and to control the access to the databases. In this exemplary embodiment, the AaaSDBX may be a proxy driver that may be used as a façade for the proprietary drivers provided by the respective transactional databases. This AaaSDBX driver may accept, e.g., Janus or Active Directory Federation Service (ADFS) accounts to authenticate the user, this way the user should not have to access the database accounts. The AaaSDBX driver may further connect, at the time of session creation, to an AaaS Microservice that may be responsible for authorizing users. The AaaSDBX may first confirm the authenticity of the user and thereafter, may verify any entitlements available to the user on the target host, e.g., via an entitlement system, to authorize the user to perform the desired operation. In some embodiments, e.g., the entitlement system may be configured to store or otherwise maintain a set of pre-approved operations for specific user roles, and may assign the roles to the user based on the operation.

Additionally, or alternatively, at the time when the temporary profiles 360 are created, the AaaS may validate the SSO, retrieve any entitlements from, e.g., a Sophia system, and verifies the approved request time period (window). Once these validations pass, the temporary profile 360 may be created with a profile expiry times as defined in the approved change request window. The Microservice may then provide the profile credentials to the AaaSDBX driver which may allow the user to run queries using the temporary profile 360 on any of the target data stores 400, individually or simultaneously, as desired by the user. The user may then execute database operations using credentials via the AaaSDBX. It should be appreciated that the user may not be exposed to the credentials via the AaaSDBX driver. Upon expiry of the time period, the AaaSDBX may perform a cleanup process which may remove accounts that may not be removed automatically by the DMS profile.

In yet a further exemplary embodiment, the user may be pre-registered in the entitlement system 300, and in particular, with AaaSDBX, such that the user permissions and entitlements may be known, and the user may be verified, e.g., via a multi-factor SSO, when the temporary profile 360 is created. Additionally, or alternatively, the user may be verified using the user internet protocol (IP) address with the SSO or other authenticating means known to persons of ordinary skill in the art. In some embodiments, e.g., the authenticating may be achieved via a single sign-on authentication. In this exemplary embodiment, and because single sign-on authentication utilizes the same sign-on credentials for future authentication requests, users may be registered only once, e.g., via the entitlement system 300. The single sign-on authentication may further utilize an identifier module operable to create, e.g., a functional identifier for the single sign-on authentication, and for associating the functional identifier with the, e.g., an employee identifier.

Figure 5:
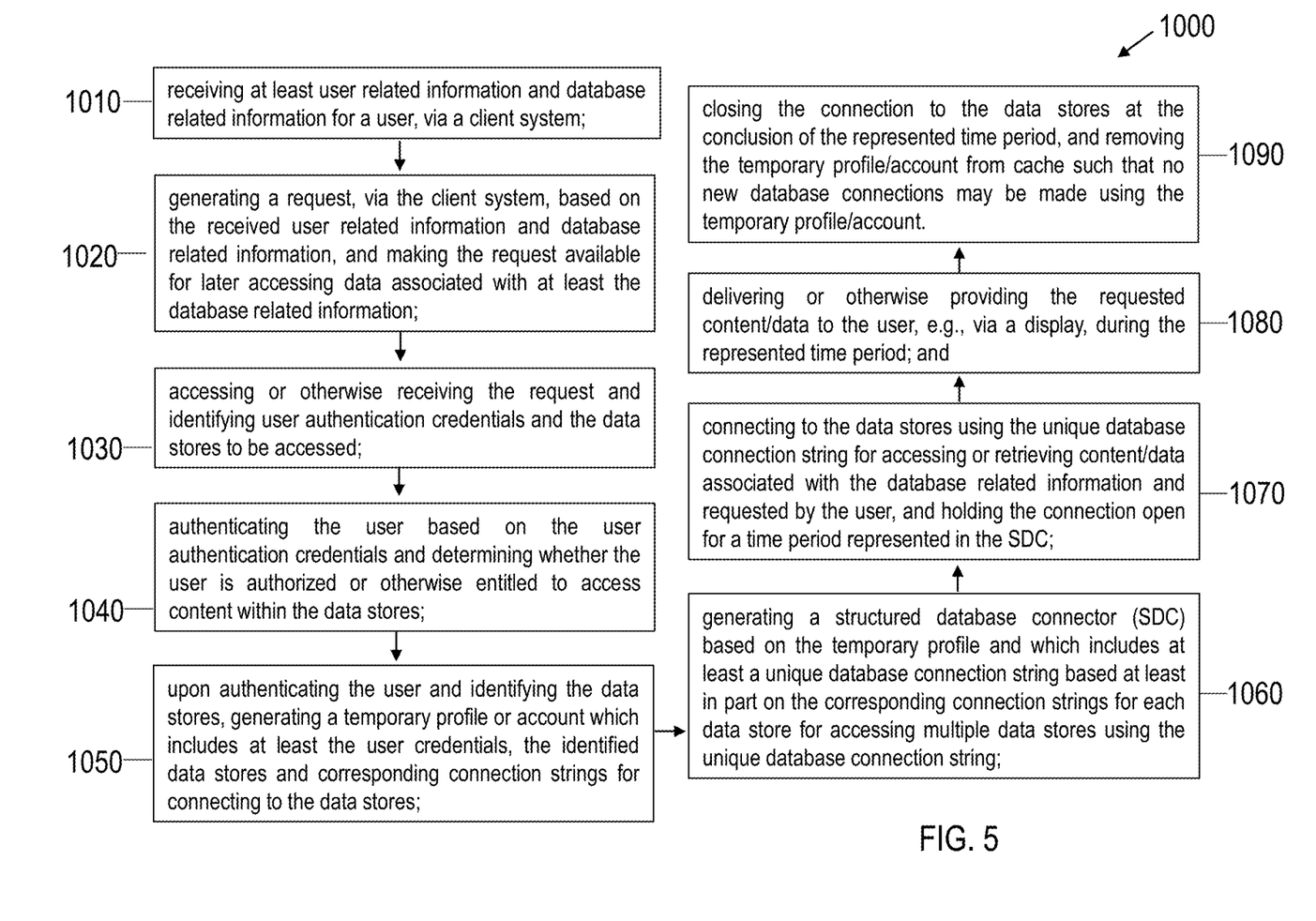
FIG. 5 illustrates a flowchart for an exemplary embodiment of a method for securely connecting to a data store in accordance with the disclosure provided herein.

With continued reference to the figures, and now with additional reference to FIG. 5, a method 1000 for securely accessing multiple data stores via a single structure database connector is provided. It should be appreciated that the method 1000 may be performed in a different order, with illustrated steps omitted, with additional steps added, or with a combination of reordered, combined, omitted, or additional steps.

In step 1010, user related information 232 and database related information 234 may be accepted or otherwise received, via the UI 210 of the client system 200, for generating a request 230 to access data associated with, e.g., the database related information 234 from one or more data stores 400 with a firm or across multiple firms. In this step, a user may login to the client system 200 and provide credentials authorizing the user to access content within the datastores 400. Upon entering or providing the user related information 232 and the database related information 234, in step 1020, the request 230 may be generated and based on or includes at least one or more of the user related information 232, the database related information 234, or a subset of data associated with the content requested from the data stores 400 by the user. The generated request 230 may then be made available for later accessing data associated with at least the database related information 234, e.g., via the entitlement system 300.

In step 1030, the request 230 may be accessed or received, e.g., via the entitlement system 300. In this step, the user's authentication credentials and/or permission may be identified from the request 230, along with information corresponding to the data stores 400 with the content requested by the user to determine whether the user is authorized or otherwise entitled to access the requested content within the data stores 400. The DMS for each data store 400 may also be identified via the request 230 along with the respective connection strings for connecting to each data store 400 identified via the request 230.

In step 1040, the user may be authenticated to access the data stores 400. Upon authenticating that the user is permitted to access the data stores 400, the step includes determining whether the user has permission to access the requested content within the data stores 400, and whether the user is permitted to perform an operation on the target data stores 400.

In step 1050, upon authenticating and verifying the user's permissions, and identifying the data stores 400 requiring a connection to access the requested content, the method includes the step of generating a temporary profile 360 for connecting to multiple data stores 400. The temporary profile 360 may be based at least on, e.g., the user related information 232, information related to each of the identified data stores 400 requiring a connection, e.g., database related information 234, and connection strings corresponding to the DMS for each of the data stores 400 requiring a connection.

In step 1060, the temporary profile 360 may further include the SDC 370 which may include a unique database connection string for connecting to and accessing each of the data stores 400 having the requested content, e.g., simultaneously. The unique database connection string may be database agnostic and be based at least in part on the corresponding connection strings to the DMS for each of the data stores 400. The SDC 370 may further include or define a duration that the access or operation on the data within the data store 400 should remain open. It should be appreciated that the temporary profile 360 may be stored in cache memory for the duration of the requested operation and may be deleted or otherwise removed once the operation duration expires.

In step 1070, the method includes the step of connecting to the data stores 400 via the unique database connection string for accessing or retrieving the requested data.

In step 1080, the requested content may be delivered or otherwise provided to the user, e.g., via the client system 200, or more particularly, via the display 240, during the duration of the operation.

Upon conclusion of the requested operation, e.g., upon expiration of the duration, in step 1090, the connection to the data stores 400 may be closed, and the temporary profile 360 held in cache memory may be delete or otherwise removed such that no new database or data store 400 connections may be made using the temporary profile 360, the SDC 370, or other temporary account created, e.g., via the entitlement system 300.

Figure 6:
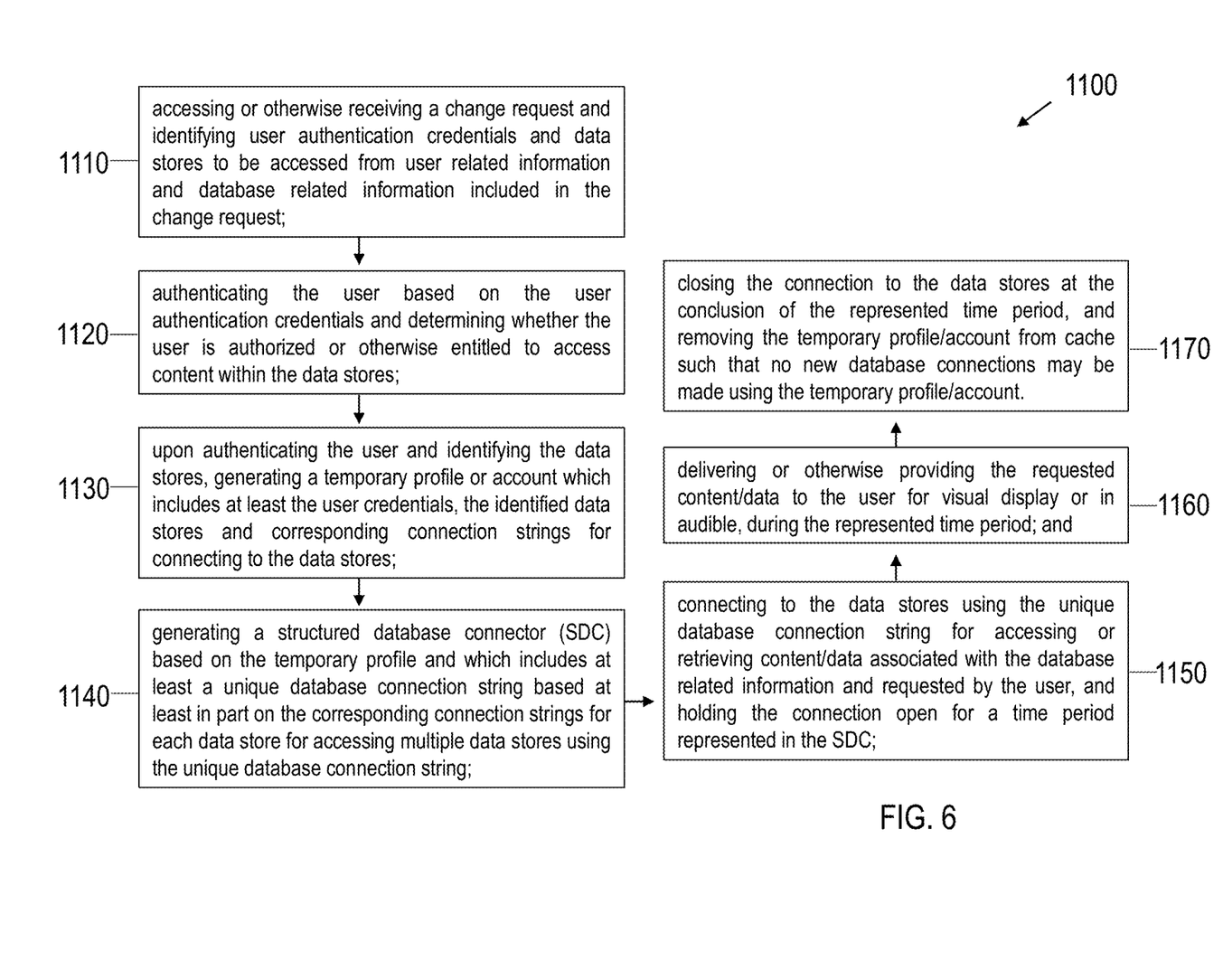
FIG. 6 illustrates a flowchart for an exemplary embodiment of a method in an entitlement module for securely connecting to a data store in accordance with the disclosure provided herein.

With continued reference to the figures, and now with additional reference to FIG. 6, a method 1100 in an entitlement system 300 (or module) for securely accessing multiple data stores is provided.

In step 1110, accessing or otherwise receiving a change request 230 and identifying user authentication credentials and data stores to be accessed in the change request 230. In this step, the entitlement system 300 may receive the change request 230, e.g., from the client system 200. The change request may include at least one or more of the user related information 232, the database related information 234, or a subset of data associated with the content requested from one or more data stores 400.

In step 1120, the method includes the step of authenticating the user based on the identified user authentication credentials. Additionally, or Alternatively, a determination may be made as to whether the user is authorized or otherwise entitled to access the requested content in the data stores 400.

Upon authenticating that the user can access the requested content, in step 1130, the target data stores 400 may be identified along with their respective DMS and corresponding connection strings, and a temporary profile 360 may be generated for connecting to the targeted data stores 400, e.g., simultaneously. The temporary profile 360 may be based at least on, e.g., the user related information 232, information related to each of the identified data stores 400 requiring a connection, e.g., database related information 234, and connection strings corresponding to the DMS for each of the data stores 400 requiring a connection.

In step 1140, the temporary profile 360 may further include the SDC 370 which may include a unique database connection string for connecting to and accessing multiple data stores 400 having the requested content, e.g., simultaneously. The unique database connection string may be database agnostic and be based at least in part on the corresponding connection strings to the DMS for each of the data stores 400. The SDC 370 may further include or define a duration that the access or operation on the data within the data store 400 should remain open. It should be appreciated that the temporary profile 360 may be stored in cache memory for the duration of the requested operation and may be deleted or otherwise removed once the operation duration expires.

In step 1150, the method includes the step of connecting to the data stores 400 via the unique database connection string for accessing or retrieving the requested data and holding the connection open for a time period represented in the SDC 370.

In step 1160, the requested content may be delivered or otherwise provided to the user for visual display or in audible, depending on the content type, during the duration of the operation.

Upon conclusion of the requested operation, e.g., upon expiration of the duration, in step 1170, the connection to the data stores 400 may be closed, and the temporary profile 360 held in cache memory may be delete or otherwise removed such that no new database or data store 400 connections may be made using the temporary profile 360, the SDC 370, or other temporary account created, e.g., via the entitlement system 300.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

Additionally, the components and materials described hereinafter as making up the various embodiments are intended to be illustrative and not restrictive. It should be appreciated that many suitable components and materials that would perform the same or a similar function as the materials described herein are intended to be embraced within the scope of embodiments of the present disclosure.

Furthermore, the term "module" or "engine" used herein will be appreciated as comprising various configurations of computer hardware and/or software implemented to perform operations. In some embodiments, modules or engines as described may be represented as instructions operable to be executed by a processor and a memory. In other embodiments, modules or engines as described may be represented as instructions read or executed from a computer readable media. A module or engine may be generated according to application specific parameters or user settings. It will be appreciated by those of skill in the art that such configurations of hardware and software may vary, but remain operable in substantially similar ways.

We claim:

1. A database connection and access management system comprising:
   a memory for storing computer-readable instructions for connecting to a plurality of data stores simultaneously and accessing data associated with a change request from a user; and
   a processor operatively connected to the memory via a communication network, wherein the processor is configured to:
   access the change request to identify user authentication credentials for granting the user access to perform an operation on the content from a plurality of data stores, and to identify at least one or more of the plurality of data stores that requires a connection, a database management system (DMS) for each data store in the plurality of data stores, or connection strings corresponding to the DMS for each data store;
   generate a temporary profile based on the user authentication credentials and the data associated with the change request, wherein the temporary profile includes a structured database connector for connecting to each of the plurality of data stores requiring a connection;
   connect to the plurality of data stores simultaneously requiring a connection via the structured database connector; and
   present the content from the plurality of the data stores to the user,
   wherein the temporary profile is a modification of the change request that indicates a version of the change request that is edited to include additional security information to generate an edited temporary profile, which may define predefined use and access restrictions for the user,
   wherein the edited temporary profile includes additional database connection security parameters and provisions to protect from spoofing, password breach, and unauthorized access,
   wherein the temporary profile is encrypted and structured such that security related information in the temporary profile is anonymous to the user,
   wherein the processor is further configured to implement:
      a time-bound limitation defined as limits on the temporary profile and connection time based on a pre-configured value, and which expires after a time period closes such that no new database connections is made using the temporary profile;
      a resource-bound limitation assigning the temporary profile a relatively lower priority over other traffic to and from a target data store as configured;
      a change or control-bound limitation that is dependent on the time-bound limitation, as operations on the target data store is allowed in a relatively lower value between a time period approved by the change request or as the pre-configured value in the time-bound time period; and
      an entitlement bound limitation defined by a set of operations that is allowed on the target database.

2. The system of claim 1, wherein the temporary profile is saved in a cache memory connected to the processor.

3. The system of claim 2, wherein the processor is further configured to identify an operation duration from the change request, and wherein the temporary profile includes the operation duration.

4. The system of claim 3, wherein the processor is further configured to close the connections to the plurality of data stores at a conclusion of the duration.

5. The system of claim 1, wherein prior to generating the temporary profile, the processor is further configured to:
   authenticate the user based on the user authentication credentials and determine whether the user is authorized to access the content from the plurality of data stores.

6. The system of claim 1, wherein the content from the plurality of the data stores is presented to the user via a display.

7. A method for connecting to a plurality of data stores simultaneously and accessing data associated with a change request from a user by utilizing a memory and a processor operatively connected to each other via a communication network, the method comprising:
   accessing the change request and identifying authentication credentials for the user and the plurality of data stores requiring a connection to present the data associated with the change request;
   authenticating the user based on the authentication credentials, and generating a temporary profile for accessing the plurality of data stores, wherein the temporary profile includes a structured database connector for connecting to each of the plurality of data stores requiring a connection;
   connecting to the plurality of data stores simultaneously via the structured database connector; and
   presenting the data from the plurality of data stores to the user,
   wherein the temporary profile is a modification of the change request that indicates a version of the change request that is edited to include additional security information to generate an edited temporary profile, which may define predefined use and access restrictions for the user,
   wherein the edited temporary profile includes additional database connection security parameters and provisions to protect from spoofing, password breach, and unauthorized access,
   wherein the temporary profile is encrypted and structured such that security related information in the temporary profile is anonymous to the user,
   wherein the method further comprising implementing:
      a time-bound limitation defined as limits on the temporary profile and connection time based on a pre-configured value, and which expires after a time period closes such that no new database connections is made using the temporary profile;
      a resource-bound limitation assigning the temporary profile a relatively lower priority over other traffic to and from a target data store as configured;

a change or control-bound limitation that is dependent on the time-bound limitation, as operations on the target data store is allowed in a relatively lower value between a time period approved by the change request or as the pre-configured value in the time-bound time period; and an entitlement bound limitation defined by a set of operations that is allowed on the target database.

8. The method of claim 7, wherein the generated temporary profile is saved in a cache memory.

9. The method of claim 7 further comprising:
identifying an operation duration from the change request and providing information corresponding to the operation duration in the temporary profile.

10. The method of claim 9 further comprising:
holding the connection to the plurality of data stores open based on the information corresponding to the operation duration; and
closing the connection at a conclusion of the operation duration.

11. The method of claim 7 further comprising:
determining whether the user is authorized to access the content from the plurality of data stores prior to generating the temporary profile.

12. A non-transitory computer readable medium comprising logic, when executed by a processor, is operable to:
access a change request to identify user authentication credentials for granting a user access to perform an operation on content in a plurality of data stores, wherein the change requests identifies at least one or more of the plurality of data stores that requires a connection to provide access, a database management system (DMS) for each data store in the plurality of data stores, or connection strings corresponding to the DMS for each data store;
generate a temporary profile based on the user authentication credentials, wherein the temporary profile includes a structured database connector for connecting to the plurality of data stores requiring a connection;
connect to the plurality of data stores requiring a connection simultaneously; and
present the content from the plurality of the data stores to the user,
wherein the temporary profile is a modification of the change request that indicates a version of the change request that is edited to include additional security information to generate an edited temporary profile, which may define predefined use and access restrictions for the user,
wherein the edited temporary profile includes additional database connection security parameters and provisions to protect from spoofing, password breach, and unauthorized access,
wherein the temporary profile is encrypted and structured such that security related information in the temporary profile is anonymous to the user,
wherein the logic, when execute, causes the processor to implement:
a time-bound limitation defined as limits on the temporary profile and connection time based on a pre-configured value, and which expires after a time period closes such that no new database connections is made using the temporary profile;
a resource-bound limitation assigning the temporary profile a relatively lower priority over other traffic to and from a target data store as configured;
a change or control-bound limitation that is dependent on the time-bound limitation, as operations on the target data store is allowed in a relatively lower value between a time period approved by the change request or as the pre-configured value in the time-bound time period; and
an entitlement bound limitation defined by a set of operations that is allowed on the target database.

13. The computer readable medium of claim 12, wherein the generated temporary profile is saved in a cache memory.

14. The computer readable medium of claim 12, wherein the logic is further operable to:
identify an operation duration from the change request, and include information corresponding to the operation duration in the temporary profile.

15. The computer readable medium of claim 14, wherein the logic is further operable to:
hold the connection to the plurality of data stores open based on the information corresponding to the operation duration; and
close the connection at a conclusion of the operation duration.

16. The computer readable medium of claim 12, wherein the logic is further operable to:
determine whether the user is authorized to access the content in the plurality of data stores prior to the temporary profile being generated.

* * * * *